Figure 7:
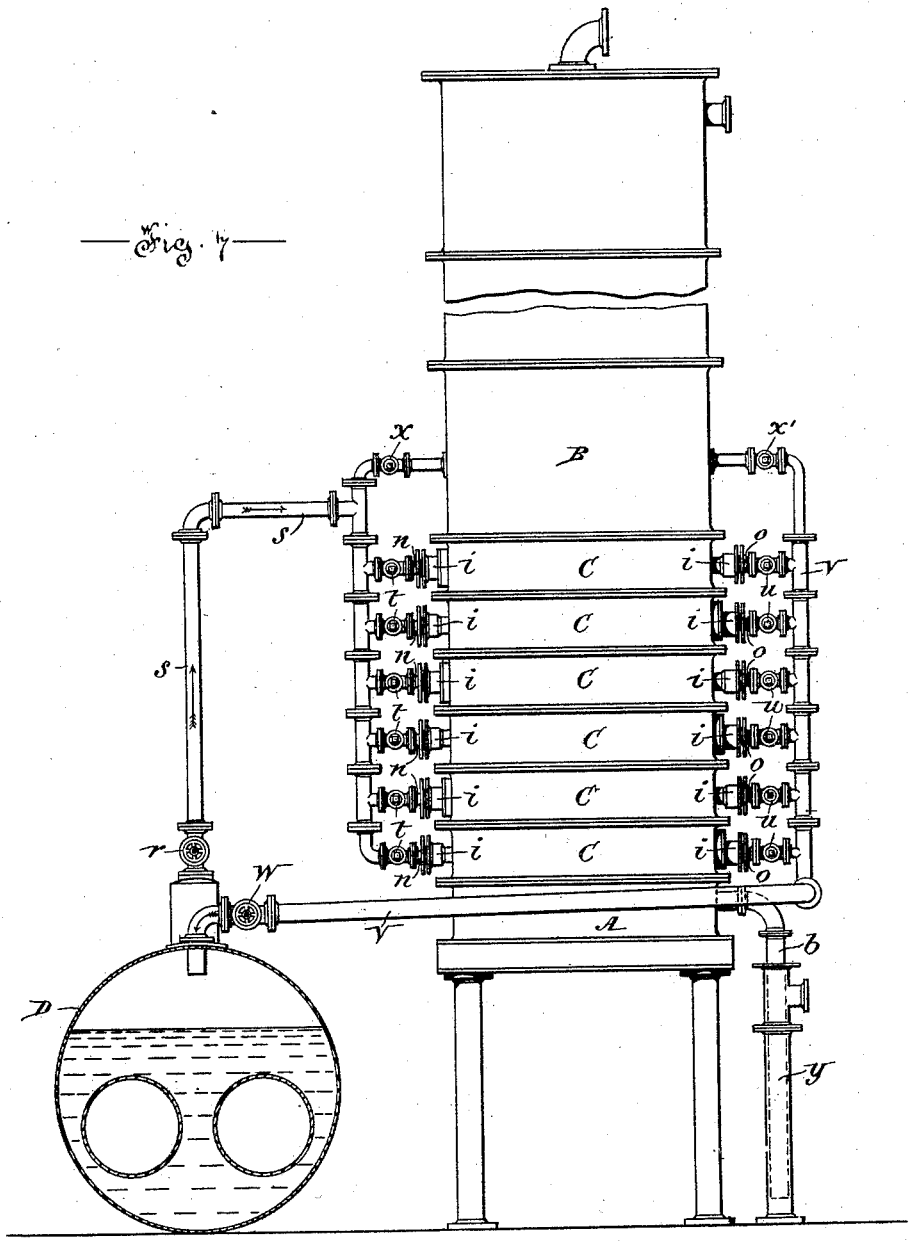

(No Model.) 4 Sheets—Sheet 1.
A. W. ELLIS.
ART OF DISTILLATION AND APPARATUS USED THEREFOR.
No. 473,659. Patented Apr. 26, 1892.
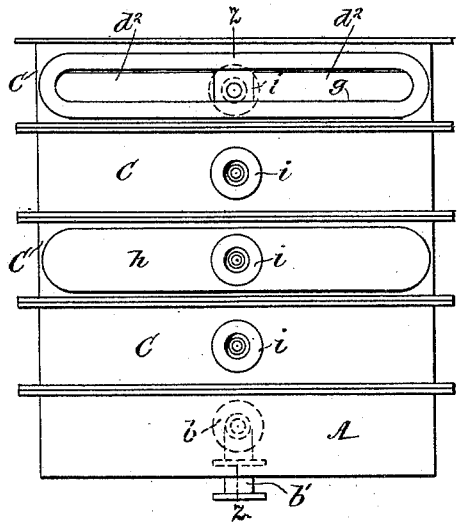
Fig. 1
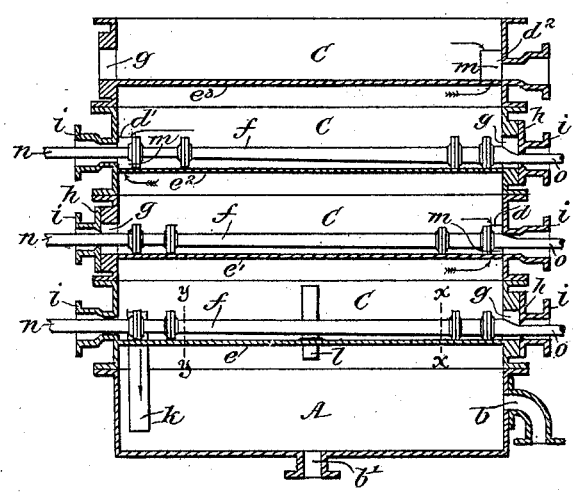
Fig. 2
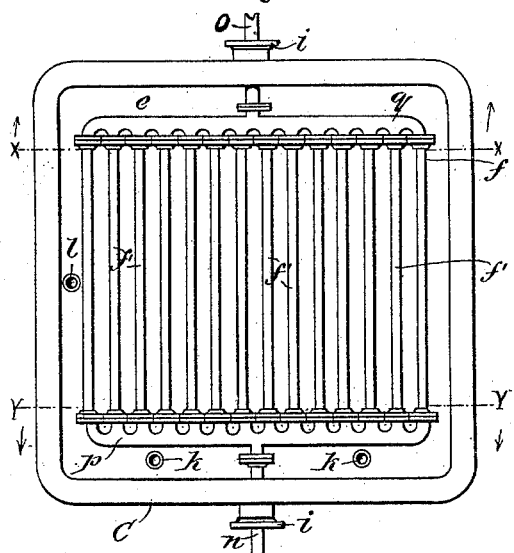
Fig. 3
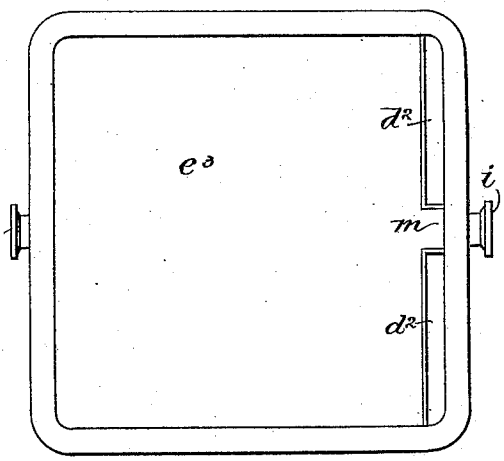
Fig. 4
Fig. 5
Fig. 6
Witnesses
Inventor
Arthur Wm. Ellis
By his Attorney (No Model.) 4 Sheets—Sheet 3.

A. W. ELLIS.
ART OF DISTILLATION AND APPARATUS USED THEREFOR.

No. 473,659. Patented Apr. 26, 1892.

(No Model.) 4 Sheets—Sheet 4.
A. W. ELLIS.
ART OF DISTILLATION AND APPARATUS USED THEREFOR.

No. 473,659. Patented Apr. 26, 1892.

UNITED STATES PATENT OFFICE.

ARTHUR W. ELLIS, OF LONDON, ENGLAND, ASSIGNOR OF ONE-HALF TO THOMAS HORSEFIELD CARMAN, OF SAME PLACE AND MONTREAL, CANADA.

ART OF DISTILLATION AND APPARATUS USED THEREFOR.

SPECIFICATION forming part of Letters Patent No. 473,659, dated April 26, 1892.

Application filed October 21, 1890. Serial No. 368,865. (No model.)

*To all whom it may concern:*

Be it known that I, ARTHUR WILLIAM ELLIS, manufacturing chemist, of 37 Queen Victoria street, in the city of London, England, have invented certain new and useful Improvements in the Art of Distillation and in the Apparatus Used Therefor; and I do hereby declare that the following is a full, clear, and exact description of the same.

My invention has reference especially to the employment in the distillation of liquids of indirect or inclosed steam and in the apparatus for such application. In the ordinary method of employing indirect steam it is usual to supply it by means of a coil or its equivalent, so arranged that it has a fall toward the outlet, which, to insure circulation of the steam and for the escape of water of condensation, superfluous steam, and air, is more or less open to the atmosphere. Thus there is a certain loss of heat, and, moreover, on account of the fall usually given to this coil, the depth of liquid over the coil gradually increases toward the outlet, and consequently uniform ebullition does not take place along its entire length. By my improvements I prevent this irregular ebullition and render the whole of the upper surfaces of the pipes efficient by adopting the arrangement and shape hereinafter described, so that the depth of the liquid undergoing distillation in any particular tray shall be equal throughout. I avoid loss of heat by preventing the escape of steam from the outlets of the coils and by causing the water of condensation to be returned to the boiler by its own gravitation.

In my invention, which is especially applicable to the tower or column still or to a modification of the well-known Coffey's alcohol-still, I place the distillation apparatus at such a height above the boiler supplying the steam that all the heating-pipes—hereinafter called "coils"—with which the still is provided (with the exception hereinafter mentioned) and the outlets and fittings connected therewith have an uninterrupted fall through the main return-pipe to the boiler, which it enters above the level of the water, not dipping therein.

Above the receiving-vessel, which forms the lower part of the still, is superposed a series of chambers, each provided with a tray containing the liquid to be distilled and a steam-coil and communicating with each other by openings on alternate sides, thus allowing the liquid (which is undergoing distillation) falling from the upper portion of the still to flow over the lips of each tray in succession onto the one beneath, and also to allow of the upward passage of the vapors generated in each chamber.

It is necessary for economical distillation that as the density, and consequently the boiling point, of the liquid increases a greater heating-surface and a less depth of liquid should be provided. I propose, therefore, to regulate the depth of liquid in each tray, except the lowermost, by the height of their lips, the lips in the uppermost being the highest to allow of the greatest depth of liquid, and each successive lip being of less height above the tray than the one above, so as to correspondingly decrease the depth of the liquid contained therein, an overflow-pipe instead of an opening with lips from the lowest tray, dipping into the liquid in the receiver and being sealed thereby, and a separate pipe above the level of the liquid in both cases connecting the two. To prevent escape of steam, the outlet-pipe is dipped into one of larger diameter, so as to seal it. As the volume of vapor passing any tray above the lowest is greater than that immediately below it, the openings between the chambers must increase in size from that between the lowest chamber and the one immediately above it, each one being larger than the one below it.

With respect to the steam-coils above alluded to I have found that a fall of one inch in five feet is one which insures a steady action of the steam and at the same time equal distillation, but with this fall in a coil or spiral of eighty feet (a very convenient length for a still about six feet square) the difference between the highest and lowest point would be sixteen inches and the quantity of liquid necessary to cover it very excessive for economic distillation. I propose, therefore, in order to avoid operating on such large quantities of material and to insure rapid and regular ebullition over the whole surface of the pipes, to arrange the several steam-coils in the form of gridirons, both ends of a series of parallel pipes being connected to pipes or cross-pieces placed at right angles thereto. To one of these, which may be perfectly level, is connected the steam-inlet pipe. The other cross-pipe may be arranged to have a fall about half an inch each way toward the middle, at which point the outlet-pipe forms a junction with it. The parallel pipes forming the gridiron are given one inch of fall from the inlet to the outlet cross-pipe, so that in the whole of the piping of which each coil is composed, and presuming the pipes to be circular in section, there will be a difference of about one inch in level. I prefer, however, that the pipes increase in the area of their cross-section from the inlet cross-piece toward the outlet cross-piece—that is, in place of ordinary cylindrical pipes I prefer to employ pipes which are circular at the inlet end, but gradually increase in their vertical diameter, while the horizontal diameter remains the same or nearly the same until they assume the shape of an oval at the outlet cross-piece, the steam-way of which is made to correspond. By this means, while securing the necessary fall at the bottom of the pipes, the upper heating-surfaces are level and equidistant throughout from the surface of the liquid undergoing distillation. Hence a still more uniform and regular ebullition is insured.

The most suitable depth of liquid that should be maintained above the coils and the pressure of steam to be employed will of course vary with the character of the liquid undergoing distillation; but within limits the thinner the layer of liquid above the coils and the greater the pressure of steam the more rapid will be the distillation; but it is absolutely necessary that under no circumstances must the depth of liquid be so small or the pressure or temperature of the steam so high as would admit of the liquid operated upon assuming the spheroidal state.

I have found that for most practical purposes the division of the liquid into a series of, say, six or eight layers in a vertical column, with the shallowest layer not less than one inch and the others from the one of greatest depth (the uppermost) diminishing by one-eighth of an inch to the shallowest layer (the lowermost) is about the proper arrangement, and I disclaim all divisions materially diverging from same.

It is important, for the more perfect and successful working of this process, that at the commencement of the operation all air as far as possible be expelled from the boiler and the main pipes, coils, and fittings connected therewith. To do this effectually, a certain amount of steam must be allowed to pass also, and it is better that this amount should be in excess of rather than under the quantity required. In order to prevent the inconvenience and loss of heat that this escape of steam into the atmosphere would occasion, air-cocks may be connected to the upper portion of the still, so that any steam passing with the air may be utilized.

When the air has been expelled, the air-cocks are to be closed, and the steam-supply cocks and return-cocks being open the circulation of the steam will commence.

For full comprehension, however, of the invention reference must be had to the annexed drawings, forming part of this specification, in which—

Figure 8:
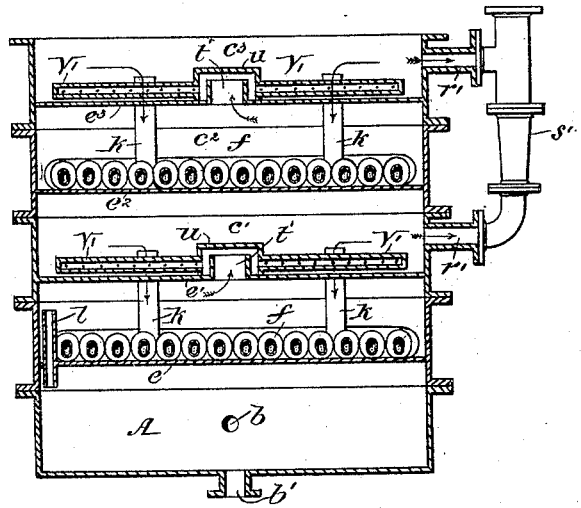
Figure 9:
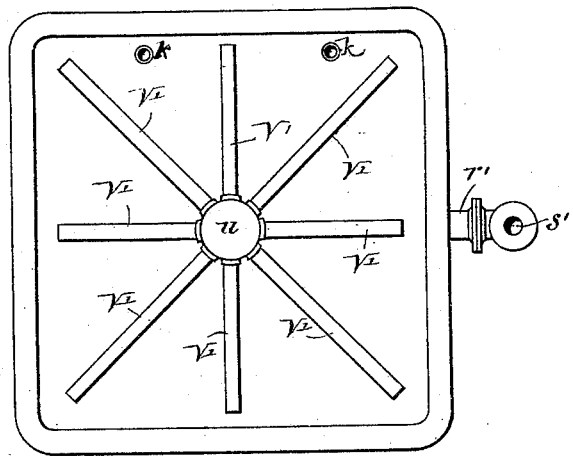
Figure 10:
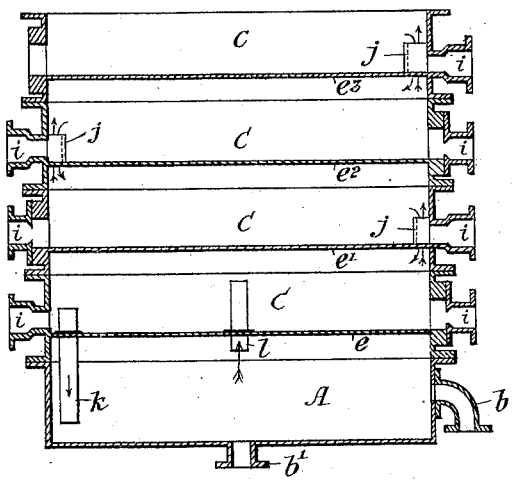
Figure 11:

Figure 1 is a view of the lower part of still; Fig. 2, a vertical sectional elevation on line $z$ $z$, Fig. 1; Fig. 3, a plan of the first chamber, showing coil; Fig. 4, a plan of second chamber without coil; Figs. 5 and 6, sections of steam-coils, taken, respectively, near the inlet and outlet cross-pipes on lines $y$ $y$ $x$ $x$, Fig. 3; Fig. 7, a general view of apparatus with section of boiler; Fig. 8, a vertical section; Fig. 9, a plan view of a modification of construction; Fig. 10, a vertical section showing a series of superimposed chambers with communicating openings increasing in area and depth of overflow, and Fig. 11 a view of the outlet end of a heating-coil or gridiron.

Like symbols denote the same parts.

A is the lower portion of the tower or column still which I usually employ, B being the upper portion, and C C C C C C being chambers above A, to be hereinafter more particularly described.

D is the boiler, and $r$ the main steam-valve; $s$, the main steam-supply pipe; $t$ $t$ $t$ $t$ $t$ $t$, the steam-inlet cocks, and $u$ $u$ $u$ $u$ $u$ $u$ the outlet-cocks, both communicating with the coils in chambers C C C; V, the main return-pipe for water of condensation to the boiler; W, the return-valve, and $x$ and $x'$ the air-cocks.

I prefer my still to be square or rectangular in shape, although I do not confine myself to this section, and to consist of a receiving-vessel, as shown more particularly in Figs. 1 and 2, provided with an outlet $b$ for spent liquid, and usually an extra outlet $b'$. Over this receiver is superposed, as shown in Figs. 1, 2, and 7, the series of chambers C C C C, hereinbefore mentioned, (six being shown in Fig. 7,) communicating with each other at opposite sides alternately by the openings $d$ $d'$ $d^2$, &c., Fig. 4. Each chamber is provided with a tray $e$ $e'$ $e^2$ $e^3$, &c., Figs. 2, 3, and 4, to contain the liquid to be distilled, and a steam-coil $f$, Figs. 2 and 3. The chambers are also provided with openings $g$, Figs. 1 and 2, for the insertion or removal of the steam-coils, with covers $h$, Figs. 1 and 2, and stuffing-boxes $i$, Figs. 1, 2, 3, 4, and 7. The usual trial-cocks, safety and vacuum valves, and gage-glasses are also provided, which for the purposes of this invention it is unnecessary to describe.

I dispense with the openings in the first tray $e$, and provide in their places the overflow-pipes $k$, Figs. 2 and 3, for the passage of spent liquid to the receiving-vessel beneath.

These pipes are raised above the bottom of the tray to a height corresponding with the depth of the liquid desired to be retained in the tray—say, for example, one inch above the top of the coil—and may dip into and be sealed by the liquid contained in the receiver; but in that case a third pipe $l$, Figs. 2 and 3, should be provided, which rises above the surface of the liquid in the tray, but does not dip into the liquid beneath. The outlet-pipe for spent liquid $b$, Figs. 1, 2, and 7, I dip into another pipe of larger diameter $y$, Fig. 7, and cause it to be constantly sealed to prevent the escape of steam. The second chamber I provide with openings $d$, having lips $j$, Fig. 4, one on each side of the short trough $m$, Figs. 2 and 4, through which the inlet-pipes $n$ and the outlet-pipes $o$, Figs. 2 and 7, pass alternately. These openings in a still of six feet square I make from three to four inches in width, according to the consistency of the liquid, and I increase the width of these openings one-half inch in each of the succeeding chambers—that is to say, if the opening $d$ in the second chamber is three inches the opening $d'$ in the third chamber will be three and one-half inches, in the fourth chamber $d^2$ four inches, and so on. I also increase the depth of overflow of the second tray $e'$, and also that of each succeeding tray, by one-eighth of an inch—that is to say, supposing the liquid in the first tray $e$ to overflow the lips $j$ at a height of one inch from the top of the coil, I arrange that in the second tray it shall overflow at a height of one and one-eighth inches, at the third at a height of one and one-fourth inches, and so on. The direction of the liquid is shown in the drawings by an arrow, thus ⟶, and the direction of the vapors by an arrow, thus ⇢. By this means the depth of liquid over the coil is proportioned to its density, so as to insure equal ebullition, and the constantly-increasing volume of vapor has a correspondingly-increased area for its passage.

As regards the heating-coils $f$, I propose, as shown specially in Fig. 3, to arrange them in the form of gridirons, a number of pipes $f'\,f'$, parallel to each other, having their ends connected to two cross-pipes, to one $p$ being connected at or near the middle of its length to the steam-inlet pipe $n$. This pipe $p$ may be perfectly level, as the quantity of water of condensation is here scarcely appreciable; but the outlet cross-piece $q$, Figs. 3 and 6, I prefer to be so arranged that it has a fall at the bottom of about one-half inch each way toward the middle, where the outlet-pipe $o$, Figs. 2, 3, and 7, is placed. By this arrangement, the gridiron proper being given one inch fall in five feet toward the outlet, the whole of the piping of which it is composed (with the exception of the inlet cross-piece) has the fall hereinbefore indicated, and there is only the small difference, supposing the pipes to be circular, of a little over one inch between the highest and lowest point of the surface thereof.

Thus small quantities of material are acted upon successively instead of a large bulk of liquid, and in consequence enormously-increased heating-surfaces are obtained in a given space. (If desired, the number of parallel pipes may be increased in the gridirons in the lower chambers.) In order, however, to secure an absolutely-level upper heating-surface, I prefer to make the pipe $f'$ as shown in Figs. 2, 5, and 6—i. e., changing gradually in vertical diameter from a circular section at the inlet end until they assume the shape of an oval at the outlet cross-piece, the horizontal diameter remaining the same, thus at once insuring the proper fall and retaining the level heating upper surface.

As a modification of the process and in the construction of the apparatus hereinbefore described and in cases where a more thorough agitation of the liquid under treatment is desirable, I adopt the arrangement shown in Figs. 8 and 9, Fig. 8 being a vertical section of four chambers and Fig. 9 a plan of one of the intermediate chambers. I cause the vapors generated in the first or lowest chamber (which is provided with a gridiron, as shown in plan, Fig. 3, and in cross-section at $f$, Fig. 8) to pass through the liquid contained in the second or intermediate chamber $c'$, Fig. 8, and I cause the vapors generated in the third chamber $c^2$, which is also provided with a gridiron, to pass through the liquid contained in the fourth chamber $c^3$, Fig. 8, which arrangement I continue throughout the whole series. I substitute for the rectangular openings $d^2\,d^2$, Fig. 4, with which each chamber in that case (with the exception of the lowest chamber) is provided, two overflow-pipes $k\,k$, Figs. 8 and 9, for the downward flow of liquid from chamber to chamber. These overflow-pipes must dip into and be sealed by the liquid contained in the chamber beneath, and the lowest chamber should be provided with a communicating pipe $l$, Fig. 8. At the center, or at any convenient part of the tray $e$, Figs. 8 and 9, forming the bottom of the intermediate chamber, I provide a raised outlet $t'$, Fig. 8, for the passage of the vapors generated in the chamber immediately beneath. Over this outlet is placed a cap or cover $u$, Figs. 8 and 9, of sufficient size to allow a clear space above and around such outlet equal to the area thereof, and to this cap are affixed several pipes $V'$, Figs. 8 and 9, radiating from the center, or a coil or coils pierced with many small holes, or any of the well-known and suitable means of efficiently distributing the vapors through the liquid may be adopted.

I attach to the sides of each intermediate chamber an outlet-pipe $r'$, Figs. 8 and 9, for the upward passage of vapors, and I connect these to an upright pipe $s'$, Fig. 8, which gradually increases in diameter in proportion to the number of chambers employed. This upright pipe is connected to the upper portion of the still B, Fig. 7, immediately below the trays, diaphragms, or their equivalents, with which the still is provided.

By adopting the apparatus and process hereinbefore described the following advantages are obtained: first, a regular and uniform distillation, for the reasons, first, that the upper heating-surfaces of the steam-pipes being level the layer of liquid above them is of the same depth throughout and offers uniform resistance to the passage of bubbles of steam formed on the surface of the pipes; secondly, both the main supply-pipe from and the main return-pipe to the boiler being connected directly to the steam-space thereof, the pressure of steam is approximately equal in all parts of the coils, which is not the case with a long continuous coil with its outlet more or less open to the atmosphere. Second. Heat is more efficiently applied to the liquid and the last traces of volatile matters are more easily recovered for the reason that as the material operated upon is reduced in volatile strength and increases in density and boiling point the layers of liquid are reduced in depth and the area of the heating-pipes is increased, and consequently ebullition is more easily set up and maintained. Third. Economy in fuel, for the reason, first, that with the exception of a small amount of heat lost by radiation from external pipes and fittings the whole of the heat generated in the boiler is either utilized in the still or returned to the boiler; secondly, practically no cold or fresh feed-water is required, for in exact proportion to the amount of steam used so is the equivalent proportion of water of condensation returned to the boiler by its own gravitation and at a high temperature; thirdly, absence of incrustation for the reason that provided the boiler were once filled with pure water it would be continuously supplied with distilled water, and thus no appreciable deposit could take place.

What I claim is as follows:

1. In the process of distillation, dividing the liquid to be distilled into a series of layers gradually decreasing in depth downward toward the lowermost, (the opposite extremes of depth being approximately two inches and one inch and the degree of diminishment about one-eighth of one inch,) and increasing in density and applying steam-heat in a plurality of streams or bodies to each layer of such liquid, as set forth.

2. In the process of distillation, dividing the liquid to be distilled into layers gradually decreasing in depth downward toward the lowermost, (the opposite extremes of depth being approximately two inches and one inch and the degree of diminishment about one-eighth of one inch,) and increasing in density and applying steam-heat in a plurality of streams or bodies through each layer in increased quantity to such liquid as the same increases in density, as set forth.

3. In distilling apparatus, the combination, with a boiler supplying steam, of the distillatory apparatus set at a height above the boiler, heating-coils within said distillatory apparatus and composed of pipes the upper wall of each of which is substantially horizontal and the lower wall inclined and with their outlets and fittings arranged to have an uninterrupted fall, feed-pipes from said boiler to said heating-pipes, and an inclined main return-pipe, with vertical connection between it and said heating-pipes, having its lowest end entering the boiler above the water-line of same and in the steam-space thereof, all as shown, and for the purpose set forth.

4. In a distilling-column, a series of superimposed chambers by which the liquid to be distilled is divided into different layers having communicating openings between them of gradually-increasing area in an upward direction to accommodate an increasing volume of vapor, and means for heating the liquid in each chamber, as set forth.

5. In a distilling-column, the combination, with a series of superimposed chambers having connecting-openings between them by which the liquid to be distilled is divided into different layers, of heating-coils located within said chambers and composed of pipes the upper wall of each of which is substantially horizontal and the lower wall inclined, for the purposes set forth.

6. In distilling apparatus, the combination, with the boiler and a distilling-column comprising a lower receiving-chamber, a series of superimposed chambers by which the liquid to be distilled is divided into different layers of varying depths, heating-coils within, and communicating openings between such superimposed chambers, of main feed and return pipes from and to said boiler, separate branch inlet and outlet pipes, respectively, between said feed and return pipes and each of said chambers, and means for regulating the supply of heat to each of said heating-coils, as set forth.

7. In a distilling-column, the combination, with a series of chambers superimposed on each other, of steam-piping contained in each and having a separate inlet and outlet, and communicating apertures between each chamber, increasing in area upward from that between the first and second chambers, substantially as and for the purposes set forth.

8. In a distilling-column, the combination, with a series of chambers superimposed on and communicating with each other, each provided with steam-piping having a separate inlet from main steam-pipe and outlet to main return-pipe, of trays in same, with overflow increasing in depth in even ratio upward, as and for the purposes set forth.

9. In combination with each of a series of the chambers *e e*, a gridiron of steam-pipes, composed of a cross inlet-pipe communicating directly with main steam-pipe, an outlet-pipe, and pipes *f′ f′*, connected with both, circular in section at or near the inlet and oval in section at the outlet, as and for the purposes set forth.

10. In a distilling-column, a series of chambers superimposed on each other, each alternate chamber being furnished with a gridiron of pipes and the intervening chambers being each constructed with a central opening from below communicating with pierced radiating pipes, and an outlet to a main pipe constantly increasing in diameter for carrying off the vapor.

London, England, October 4, 1890.

ARTHUR W. ELLIS.

In presence of—
 FREDK. RHODES,
 CHARLES STEWART CULLEY.